(No Model.) 2 Sheets—Sheet 1.
F. G. HARFORD.
CURRENT WATER MOTOR.
No. 587,814. Patented Aug. 10, 1897.
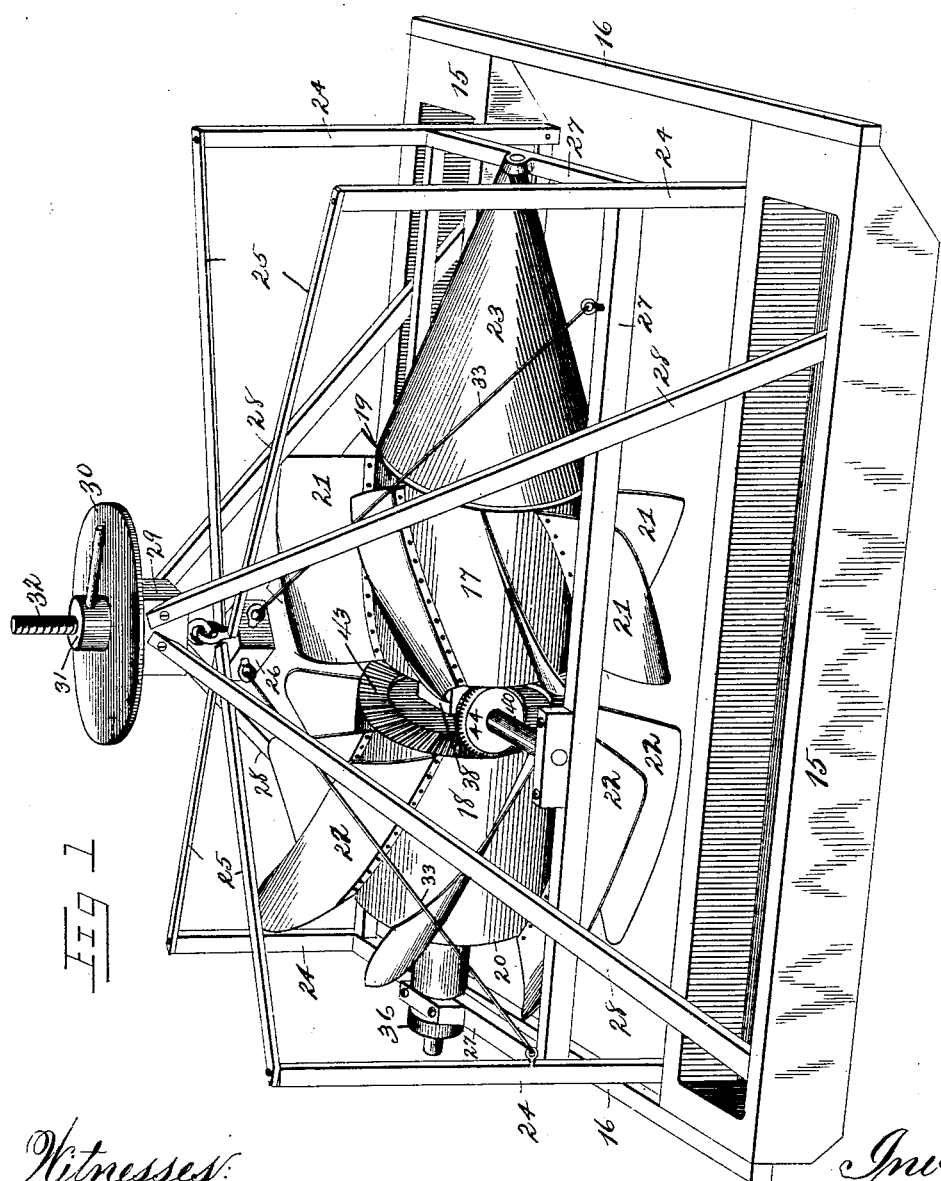
Witnesses:
C. W. Graham
W. T. Tompkins
Inventor
Frederick G. Harford,
By Chas. C. Buckley
Attorney (No Model.) 2 Sheets—Sheet 2.
F. G. HARFORD.
CURRENT WATER MOTOR.
No. 587,814. Patented Aug. 10, 1897.
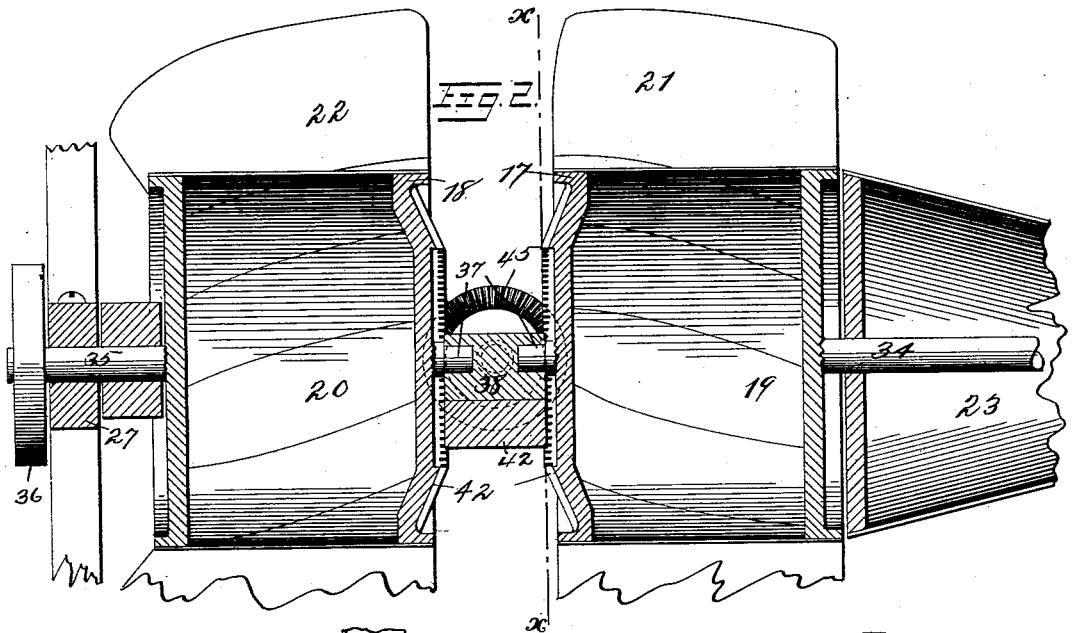
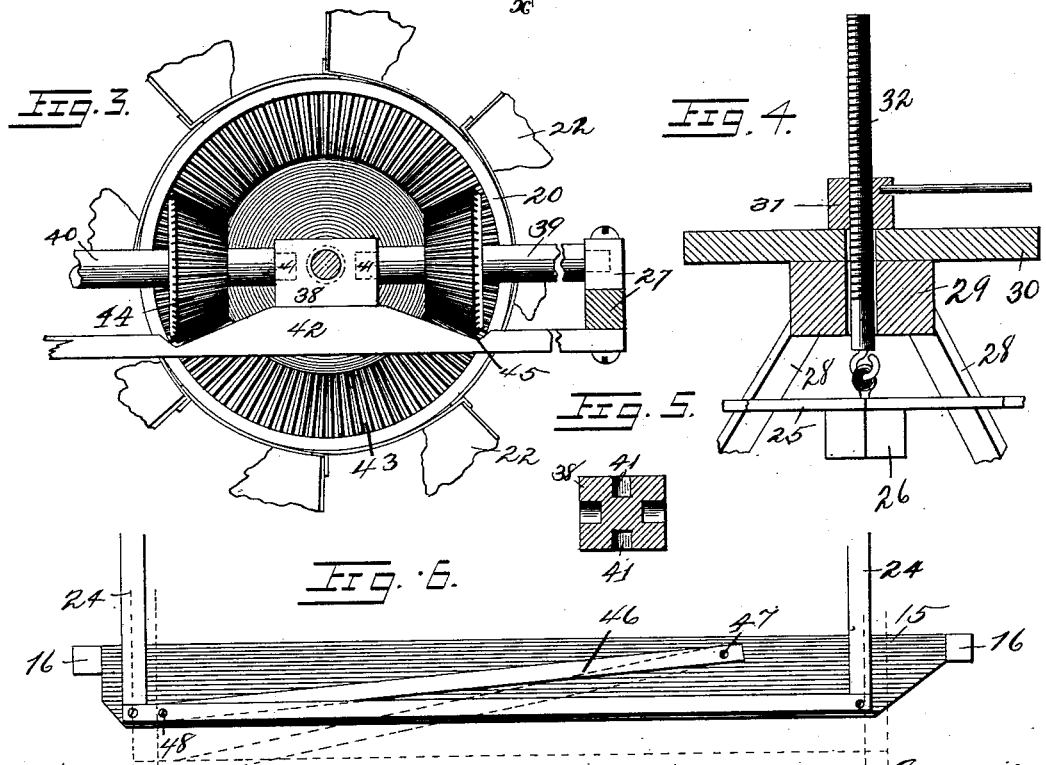
Witnesses:
C. W. Graham
W. T. Tompkins
Inventor
Frederick G. Harford
By Chas. E. Buckley
Attorney

UNITED STATES PATENT OFFICE.

FREDERICK G. HARFORD, OF PATAHA CITY, WASHINGTON.

CURRENT WATER-MOTOR.

SPECIFICATION forming part of Letters Patent No. 587,814, dated August 10, 1897.

Application filed May 8, 1895. Renewed June 1, 1897. Serial No. 638,959. (No model.)

*To all whom it may concern:*

Be it known that I, FREDERICK G. HARFORD, a citizen of the United States, residing at Pataha City, in the county of Garfield and State of Washington, have invented certain new and useful Improvements in Current Water-Motors, of which the following is a specification.

My invention relates to improvements in an apparatus which as a whole is mounted upon a float or floats and positioned in a stream of running water in such a manner as to utilize the current of the water for motive purposes.

The object of my invention is to multiply and increase the resultant power effect and also to provide means by which to intensify and concentrate the velocity and increase the density of the running water.

My invention consists in the combination and arrangement of the parts more particularly described hereinafter, reference being now had to the accompanying drawings, in which—

Figure 1 is a perspective view of the complete device shown mounted upon the float in position for use. Fig. 2 is a central longitudinal section through the rotating instrumentalities. Fig. 3 is a cross-sectional view in the direction of the arrows on the line $xx$ of Fig. 2. Fig. 4 is a detail view, partly in section, of the adjusting device. Fig. 5 is a detail view of the journal-box for the shafts. Fig. 6 is a detail view of the connections between the frame and the raising and lowering devices.

In the carrying out of my invention I provide, as shown, two floats 15, connected together by the cross-bars 16, which floats are anchored or held by spuds in mid-stream in any suitable manner, so that the currents of running water may pass longitudinally between the floats 15.

Mounted, in any manner to be described, between the two floats 15 are the current-actuated wheels 17 and 18, which consist of the drums 19 and 20 and the blades or flukes 21 and 22. The flukes 21 of the wheel 17 trend in one given direction, and the flukes 22 of the wheel 20 trend in an opposite direction, as shown more clearly in Fig. 1.

Located in front of the current-actuated wheel 17 is a cone-shaped deflector 23, which is preferably held in a stationary position.

The current-actuated apparatus as a whole is suspended in a movable frame consisting of the uprights 24, and the tie-bars 25, which meet together and are secured to the block 26, the shaft-holding bars 27 being connected to the uprights 24. Secured to and projecting convergingly upward from the floats 15 are the supporting-rods 28, which meet together and are secured to the block 29, a platform 30 being located above the block 29. The block 26 is suitably connected with the block 29, and the frame carrying the current-actuated apparatus is thereby suspended and held. Above the platform 30 is a block 31, screw-threaded, and through which the screw-threaded lifting or adjusting rod 31 passes, an operating-rod 32 being connected to the block 31. Extended from the block 26 to the shaft-holding bars 27 are the stays 33.

Referring now more particularly to Figs. 2 and 3, it will be observed that the current-actuated wheel 19 is mounted upon the axial shaft 34 and the wheel 20 is mounted upon the axial shaft 35, the latter carrying the pulley-wheel 36, by which the power may be transmitted to the shore by means of a belt or other suitable appliance. These two shafts are journaled in the shaft-holding bars 27 of the frame and also in the journal-boxes 37 of the journal-block 38, Fig. 5.

By reason of the differential trend or inclination of the blades 21 and the blades 22 it is evident that the running water, first acting upon the blades 21 of the wheel 17, will cause it to rotate in one given direction, and the running water then acting upon the blades 22 of the wheel 18 will cause it to rotate in a direction opposite to that of the wheel 17.

In order that the energy of both wheels may be united and conjointly caused to rotate the pulley-wheel 36, and thus transfer their united energy, I provide the counter-shafts 39 and 40, the one end of each of which is journaled in the shaft-holding bars 27 and the other end of each journaled in the boxes 41 of the journal-block 38, which journal-block is supported and held in place by means of the cross-bar 42, Fig. 3.

Secured to each of the current-actuated wheels is the annular bevel-gear 43, and on the shafts 39 and 40 the bevel gear-wheels 44 and 45 are mounted.

As the wheel 17 rotates in one direction the bevel gear-wheels 44 and 45, mounted upon independent shafts, are rotated by meshing with the annular gear 43 of that wheel, and this movement of rotation of the wheel 17 is thereby imparted to the wheel 18 by means of these interposed gear-wheels 44 and 45 meshing with the annular gear secured to the wheel 18, and thereby the two wheels are coupled together and yet permitted independent rotations in different directions.

The cone-shaped deflector 23, located in front of the wheel 17, is employed for the purpose of increasing the velocity and density of the water and concentrating its action upon the blades of the wheel.

In order to adjust the degree of submergence of the wheels in the water of the stream, the operator, by means of the rod 32, raises and lowers the independent frame holding the wheels and their connections.

In order to secure the frame holding the apparatus steadily in position relative to the floats, I provide the connecting-rods 46, Fig. 6, pivoted at 47 to the floats 15 and at 48 to the frame.

Having thus described my invention, what I claim as new therein, and desire to secure by Letters Patent, is—

1. A current-motor for use in a running stream, comprising floats secured together, supports rising from the floats and converging at their upper ends, and connected by a block, and a screw extending through an opening in said block, in combination with a frame suspended from said block, between the floats and comprising vertical and horizontal bars connected together, and a central block secured to the converging ends of bars secured at their opposite ends to the vertical bars of the frame, and suspended from the first-mentioned block, oppositely-rotating shafts provided with blades, and counter-shafts, said oppositely-rotating shafts and counter-shafts being geared together to concentrate the power of the oppositely-rotating shafts, substantially as shown and described.

2. In a current-motor, the combination with the floats secured together, and provided with converging supports and a central block and adjusting-screw, of a frame suspended from said block and comprising vertical and horizontal bars, converging bars secured at their outer ends to the vertical bars and at their inner ends to a block braced to the frame, pivoted connecting-bars between the frame and the floats, oppositely-rotating blade-wheels, counter-shafts arranged at right angles to the axes of the rotating wheels, gearing between said shafts for combining the power of the wheels into a single rotary movement, and a longitudinally-disposed cone in front of the wheels to divert and increase the velocity of the water-current, substantially as described.

In testimony whereof I affix my signature in presence of two witnesses.

FREDERICK G. HARFORD.

Witnesses:
LESTER GIBSON,
E. W. GIBSON.